(12) United States Patent
Wakasugi

(10) Patent No.: US 6,195,109 B1
(45) Date of Patent: Feb. 27, 2001

(54) ELECTROPHOTOGRAPHIC PRINTER

(75) Inventor: Nobuo Wakasugi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/255,445

(22) Filed: Feb. 23, 1999

(30) Foreign Application Priority Data

Feb. 25, 1998 (JP) .................................................. 10-060489

(51) Int. Cl.$^7$ .................................................. G03G 15/04
(52) U.S. Cl. .......................................... 347/132; 347/237
(58) Field of Search .................................. 347/130, 131, 347/237, 247, 132

(56) References Cited

U.S. PATENT DOCUMENTS 5,657,069 * 8/1997 Kelly et al. ........................... 347/237

FOREIGN PATENT DOCUMENTS 3-41864 * 2/1991 (JP) .

* cited by examiner

Primary Examiner—Joan Pendegrass
(74) Attorney, Agent, or Firm—Rabin & Champagne, P.C.

(57) ABSTRACT

An electrophotographic printer has a print head that illuminates a photoconductor to form an electrostatic latent image. The print head has light-emitting elements. Each corresponding to a pixel of the image and emitting light when driven. Drive circuits are provided for driving the light-emitting elements. Each drive circuit drives a corresponding one of the light-emitting elements in accordance with a value of the pixel. A controller controls the drive circuits to start driving corresponding light-emitting elements in a predetermined order.

13 Claims, 12 Drawing Sheets

ELECTROPHOTOGRAPHIC PRINTER

FIELD OF THE INVENTION

The present invention relates to an electrophotographic printer where a surface of a photoconductor is illuminated by a fixed print head having a plurality of light-emitting elements.

DESCRIPTION OF THE RELATED ART

An electrophotographic printer is a known conventional apparatus where a surface of a photoconductor is illuminated by a non-movable print head having a plurality of light-emitting elements. Such types of print head include an LED head and LCS (liquid crystal shutter) head. The print head has non-movable part as the name implies and a short light path, simplifying its optical system as well as lending itself to miniaturizing the print head.

FIG. 13 illustrates a part of a conventional printer. An LED head 3 is constructed of an LED array 4, drive unit 5, and optical system, not shown. The LED array 4 has a plurality of LEDs 7. The drive unit 5 has a plurality of drive circuits 8 each of which drives a corresponding LED 7. The optical system directs the light emitted from the LEDs 7 to form the images of the light on the photoconductor. The drive circuits 8 are serially connected so that the image data is serially transferred therethrough. The image data is input to an endmost drive circuit (leftmost) of a row of the drive circuits and sequentially transferred to another endmost circuit (right most) on the other end of the row. When all the image data for one line has been transferred to the drive circuits 8, the image data is latched and the corresponding LEDs 7 are energized to emit light.

Recent remarkable improvement of performance of personal computers has brought about the need for printer output of as high a quality as photographs. The LED head 3 used in the conventional electrophotographic printers are driven in such a way that all the LEDs 7 are energized simultaneously and therefore are capable of representing only an image consisting of dots expressed in binary values. Therefore, when an image is to be printed with gradation, pseudo gradation such as dither method and error diffusion method are used. The dither reduces the resolution of the image. The error diffusion method suffers from an inherent problem of a striped pattern. Thus, these methods impose limitations on high quality print out.

Electrophotographic printers using conventional LED heads suffer from a problem that simultaneously energizing all the LEDs requires a large current that causes noise. The noise in turn causes deteriorated print quality.

SUMMARY OF THE INVENTION

An object of the invention is to provide an electrophotographic printer which prints images with gradation while maintaining high resolution.

Another object of the invention is to provide an electrophotographic printer where energization of the lightemitting elements is started at shifted timings so that a total current required for driving the light-emitting elements is as small as possible.

An electrophotographic printer has a print head which illuminates a photoconductor to form an electrostatic latent image thereon. The print head has a plurality of light-emitting elements. Each light emitting element corresponds to a pixel of the image and emits light when driven. A plurality of drive circuits are provided. Each drive circuit drives a corresponding one of the plurality of light-emitting elements in accordance with a value of the pixel. A controller controls the plurality of drive circuits to start driving corresponding light-emitting elements in a predetermined order.

The value of the pixel describes, for example, a length of time during which a corresponding light-emitting element is energized to emit light.

The electrophotographic printer may include a memory and a correction section. The memory stores correction values for corresponding light-emitting elements. Using the correction values, the correction section changes the lengths of time to accommodate variations of light-emitting characteristics of the light-emitting elements.

The drive circuits are connected to a common data bus and the controller outputs values of pixels to the drive circuits over the common data bus.

The drive circuits are connected to a common address bus. Each drive circuit has a corresponding address and an address memory which stores the corresponding address. The controller outputs an address over the common address bus, the address specifying a corresponding drive circuit. Each drive circuit receives the value of the pixel only when the address stored in the address memory coincides with the address outputted from the controller.

The drive circuits are serially connected such that a timing signal is sequentially transferred through the drive circuits from a preceding drive circuit to a following drive circuit upon a clock. Each drive circuit starts driving a corresponding light-emitting element upon the timing signal supplied thereto.

The drive circuit has a counter that counts the length of time described by the value of the pixel. The drive circuit starts driving the corresponding light-emitting element when the counter is loaded with the length of time and stops driving when the counter has counted to a predetermined.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE INVENTION

Preferred embodiment of the present invention will be described in detail with reference to the accompanying drawings.

First Embodiment

<Construction>

Figure 1:
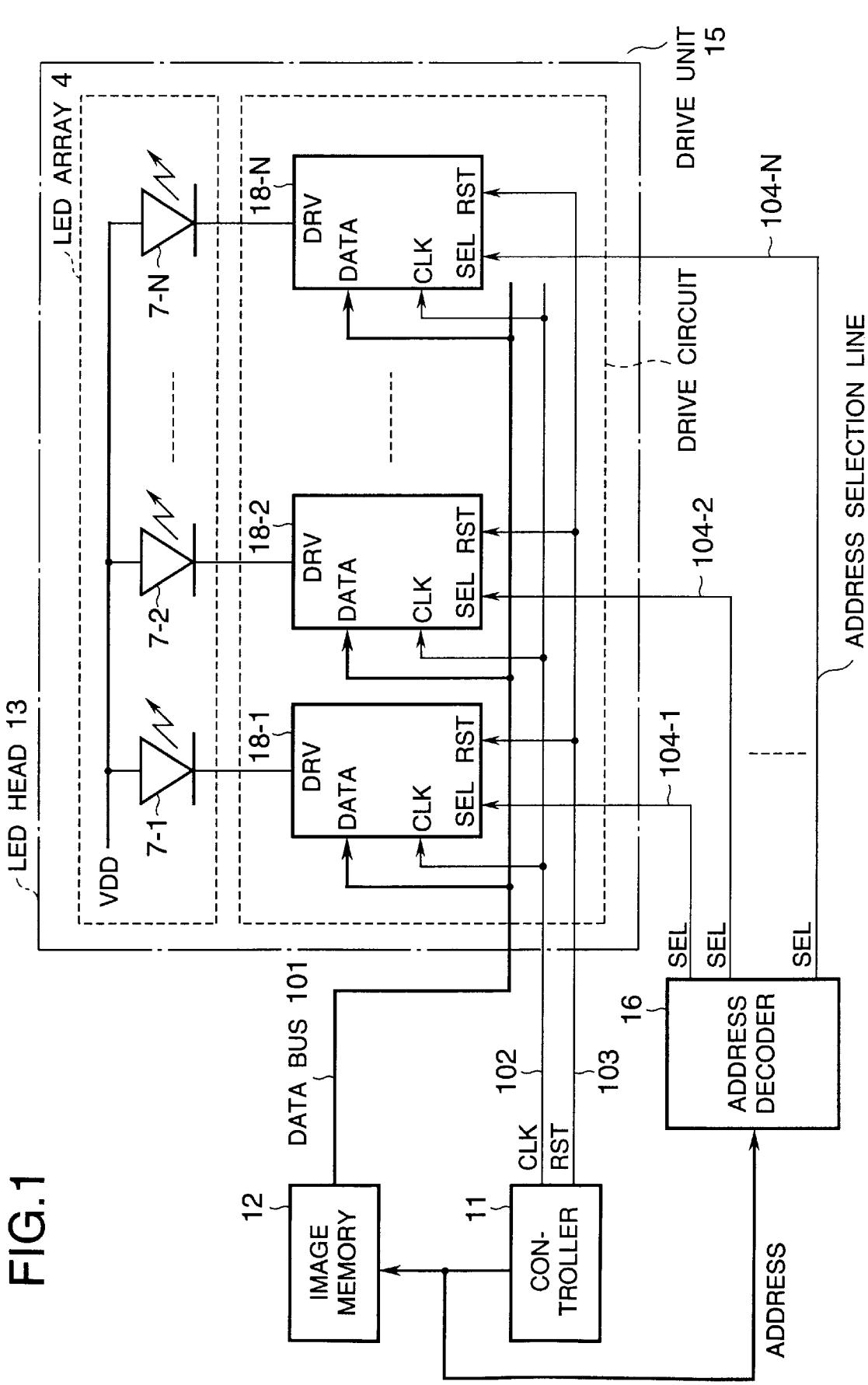
FIG. 1 shows a relevant portion of a first embodiment of an electrophotographic printer of the invention.

FIG. 1 shows a relevant portion of a first embodiment of an electrophotographic printer of the invention. The electrophotographic printer includes a controller 11, an image memory 12, an LED head 13, and an address decoder 16. The LED head 13 includes an LED array 4 having LEDs 7-1 to 7-N aligned in line, and a drive unit 15 having drive circuits 18-1 to 18-N. The drive circuits are connected to corresponding LEDs.

Each of the drive circuits 18 has input terminals DATA, CLK, SEL, and RST and an output terminal DRV. The input terminals DATA are connected to the image memory 12 via a data bus 101 that includes a plurality of data signal lines. The input terminals CLK are connected to the controller 11 via a common control signal line 102. The input terminals SEL are connected to the address decoder 16 via the address selection lines 104-1 to 104-N. The input terminals RST are connected to the controller 11. The output terminals DRV are connected to corresponding LEDs 7.

The image memory 12 stores a multi-value image on a line-by-line basis. A train of up to n+1 bits presents each pixel of the multi-value image. The controller 11 outputs addresses to the image memory 12 in order to read the data for pixels. When addressed, the image memory 12 outputs values of pixels of image data to the drive circuits 18 over the data bus 101. The controller 11 outputs the clock CLK over the control signal line 102, the reset signal RST over the control signal line 103, thereby controlling the respective drive circuits 18 in the drive unit 15. The RST is used to initialize the respective drive circuits 18.

The controller 11 also outputs addresses to the address decoder 16. The address decoder 16 decodes the address received from the controller 11 to select one of the address lines 104 corresponding to the received address, and outputs an active SEL signal to the selected address selection line 104.

Figure 2:
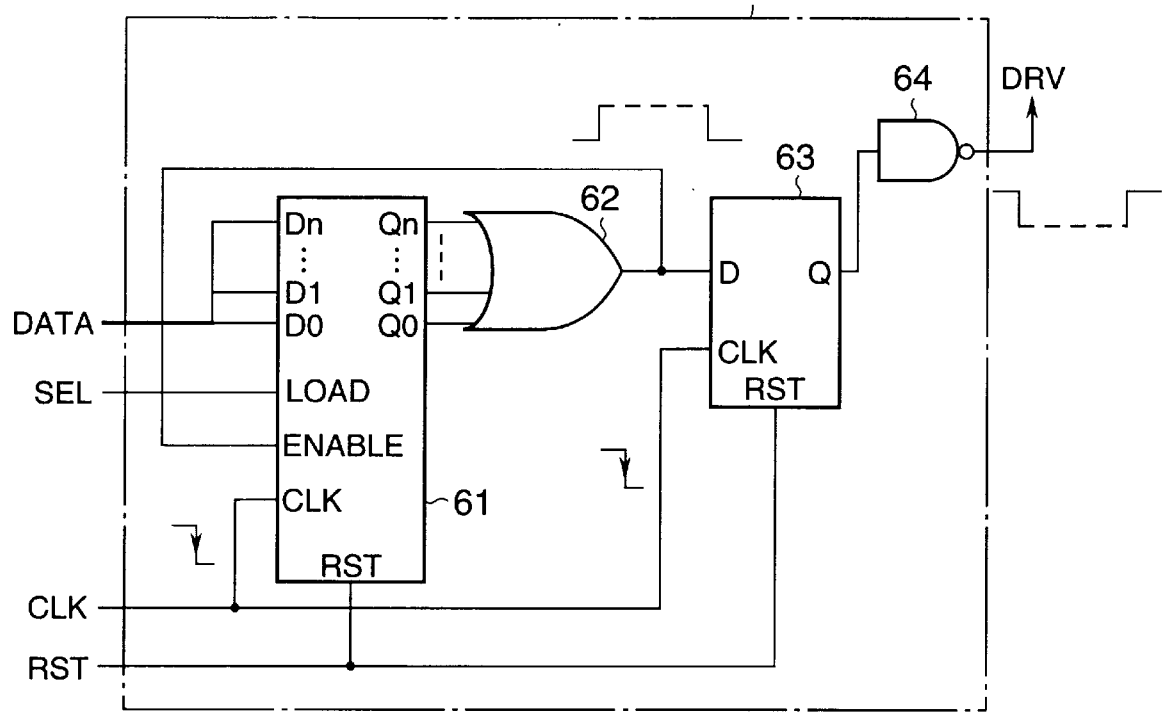
FIG. 2 is a block diagram illustrating a configuration of the drive circuit 18 of FIG. 1.

FIG. 2 is a block diagram illustrating a configuration of the drive circuit 18 of FIG. 1.

The drive circuit 18 includes a down counter 61, OR gate 62, flip-flop 63, and NAND gate 64.

The down counter 61 has input terminals D0-Dn and output terminals Q0-Qn. The down counter 61 also has input terminals LOAD, ENABLE, CLK, and RST. The input terminals D0-Dn are connected to the input terminal DATA of the drive circuit 18 and receive n+1 bits for each pixel over the data bus 101 from the image memory 12. The input terminal LOAD is connected to the input terminal SEL and receives the SEL signal over one of the address selection lines 104-1 to 104-N from the address decoder 16. The input terminal CLK is connected to the input terminal CLK of the drive circuit 18. The input terminal RST is connected to the input terminal RST of the drive circuit 18 and receives the RST signal.

When the SEL signal becomes active, the down counter 61 receives the value of a pixel on the data bus 101 via the input terminals D0-Dn and outputs them on the output terminals Q0-Qn. The outputs of the down counter 61 are inputted to the OR gate 62.

The OR gate 62 produces a logical sum of the Q0-Qn and outputs an output to the input terminal ENABLE of the down counter 61 and the input terminal D of the flip-flop 63. The OR gate 62 outputs a logic "1" when at least one of the outputs Q0-Qn is a logic "1" and a logic "0" when all the bits are a logic "0". As long as the output of the OR gate 62 is a logic "1", the down counter 61 remains enabled and continues to count down the value of the pixel by one upon the clock CLK.

The flip-flop 63 has input terminals D, CLK, and RST and output Q. The input terminal D is connected to the output terminal of the OR gate 62. The input terminal CLK receives the clock CLK via the control signal line 102. The input terminal RST receives the RST signal over the control signal line 103.

The flip-flop 63 receives at the input terminal D the output of the OR gate 62 and latches the input signal. The output Q of the flip-flop 63 is outputted to the NAND gate 64.

The NAND gate 64 has an input terminal and an output terminal. The output of the NAND gate 64 is connected to the output terminal DRV of the drive circuit 18. When the output of the flip-flop 63 is a logic "1", the NAND gate 64 drives the LED 7 connected to the output terminal DRV.

<Operation>

Figure 3:
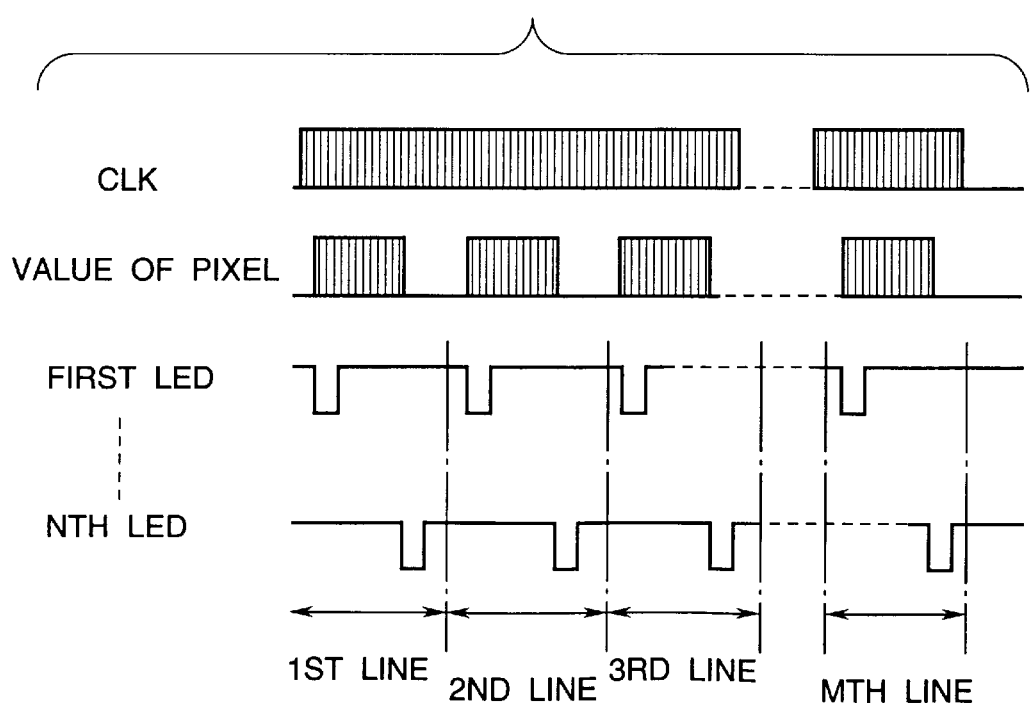
FIG. 3 is a timing chart illustrating the operation of the electrophotographic printer of the first embodiment of FIGS. 1 and 2.

FIG. 3 is a timing chart illustrating the operation of the electrophotographic printer of the first embodiment of FIGS. 1 and 2.

The multi-value image stored in the image memory 12 is sequentially read out on a line-by-line basis, from the first line to the last line. The value of the top pixel of a line is input into the first drive circuit 18 and then the value of the second pixel and so on until the value of the last pixel of the line has been inputted.

The controller 11 outputs addresses for the respective pixels of each line, one address upon one clock CLK, to the image memory 12 and the address decoder 16. The image memory 12 outputs over the data bus 101 in sequence the values of pixels specified by corresponding addresses to the drive circuits 18 while at the same time the address decoder 16 decodes the addresses to select corresponding address selection lines 104-1 to 104-N and set the corresponding SELs active.

For example, when the value of the first pixel of the line is outputted to the drive unit 15, the address selection signal line 104-1 is selected so that the value of the first pixel is inputted to the first drive circuit 18-1. Thus, the first LED 7-1 is energized.

Likewise, when the value of the second pixel of the line is outputted to the drive unit 15, the address selection signal line 104-2 is selected so that the value of the second pixel is inputted to the second drive circuit 18-2. Thus, the second LED 7-2 is energized.

In this manner, the LEDs are energized sequentially.

Figure 4:
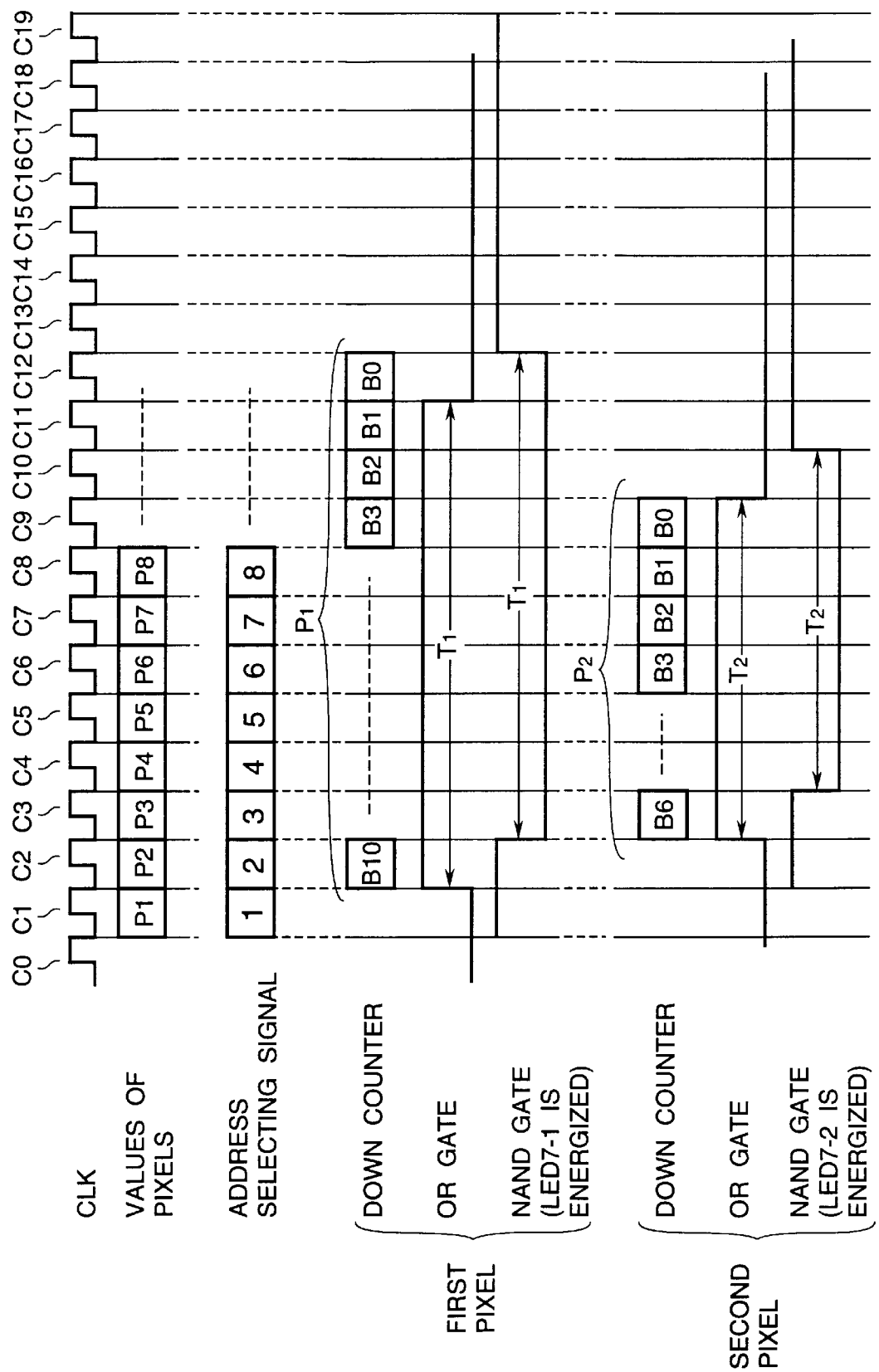
FIG. 4 is a timing chart illustrating the operation of the electrophotographic printer of FIGS. 1 and 2.

FIG. 4 is a timing chart illustrating the operation of the electrophotographic printer of FIGS. 1 and 2.

FIG. 4 illustrates, by way of example, the detailed operation of the drive circuits 18-1 and 18-2 when the values of pixels in the first and second lines are transferred.

First, the operation of the drive circuit 18-1 will be described.

The image memory 12 is addressed on the falling edge of clock C0 to output the value P1 of the first pixel of the first line to the data bus 101 while at the same time the address decoder 16 selects the corresponding address selection signal line 104-1 and sets the SEL active. When the SEL becomes active, the LOAD of the down counter 61 becomes active.

The down counter 61 is loaded with the value P1 through terminals D0-Dn on the falling edge of clock C1. As a result, the output of the OR gate 62 becomes a logic "1" which sets the ENABLE active.

The output of a logic "1" of the OR gate 62 is latched into the flip-flop 63 on the falling edge of clock C2 so that the NAND gate 64 drives the LED 7-1. Simultaneously, the down counter 61 begins to count down the value P1 on the falling edge of clock C2, the value P1 being counted down on the falling edges of the clocks.

During a period from the falling edge of clock C2 to the falling edge of C11, the value G1 is decremented by one on each clock. The value of P1 is, for example, "1010" (=10 decimal). The output of the OR gate 62 remains a logic "1" during this period and the output of the flip-flop 63 remains a logic "1". The NAND gate 64 drives the LED 7-1 so that the LED 7-1 remains energized.

The down counter 61 counts down to zero on the falling edge of clock C11 and the output of the OR gate 62 becomes a logic "0" so that the ENABLE of the down counter 61 is no longer active. The output of the flip-flop 63 still holds a logic "1" and the NAND gate 64 still energizes the LED 7-1. On the falling edge of clock C12, the output (logic "0") of the OR gate 62 is latched into the flip-flop 63 so that the NAND gate 64 stops energizing the LED 7-1. In this manner, the LED 7-1 is energized to emit light for a period corresponding to 8 clocks.

Next, the operation of the drive circuit 18-2 will be described.

The image memory 12 is addressed on the falling edge of clock C2 to output the value P2 of the first pixel of the second line from the image memory 12 to the data bus 101 while at the same time the address decoder 16 selects the address selection signal line 104-2 and sets the SEL active. The value of P2 is, for example, "0111" (7 decimal). When the SEL becomes active, the LOAD of the down counter 61 becomes active. On the falling edge of clock C2, the down counter 61 is loaded with the value G2 through terminals D0-Dn. Since at least one bit of the value G2 is a logic "1", the output of the OR gate 62 becomes a logic "1" which sets the ENABLE of the down counter 61 active.

The output (logic "1") of the OR gate 62 is latched into the flip-flop 63 on the falling edge of clock C3 so that the NAND gate 64 drives the LED 7-2. At the same time, the down counter 61 begins to count down on the falling edge of clock C3, the value being counted down on the falling edges of the clocks.

During a period from the falling edge of clock C3 to the falling edge of clock C9, the value of the data G2 is decremented by one on the falling edges of clocks C3–C9. The output of the OR gate 62 remains a logic "1" during the period and the output of the flip-flop 63 remains a logic "1". The NAND gate 64 drives the LED 7-2 to remain energized.

The down counter 61 counts down to zero on the falling edge of clock C8. As a result, the output of the OR gate 62 also becomes a logic "0" so that the ENABLE of the down counter 61 is disabled. However, the output of the flip-flop 63 still holds a logic "1" and the NAND gate 64 still energizes the LED 7-1.

On the falling edge of clock C10, the output (logic "0") of the OR gate 62 is latched into the flip-flop 63 so that the NAND gate 64 stops energizing the LED 7-1. In this manner, the LED 7-2 is energized to emit light for a period corresponding to 7 clocks.

<Advantages>

The energization of LEDs is started in a predetermined order and each LED remains energized for a period described by a corresponding value P1-PN of pixels. In this manner, the energization of earlier LEDs will have completed by the time the energization of later LEDs is initiated. The LEDs are not energized simultaneously. Thus, the LED print head of the present invention requires a much smaller current during energization of the LEDs than the conventional LED print head where all the LEDs are simultaneously energized.

It is to be noted that the drivers 18 drive corresponding LED 7 to emit light for a length of time described by the value P. The conventional electrophotographic printer is capable of printing only a two-value image and therefore the gradation of image has been effected in a pseudo gradation by using the error diffusion method.

In the present invention, the gradation of each pixel can be expressed by energizing the LED 7 for a length of time described by a corresponding value P and therefore images can be printed with high quality gradation as compared to the error diffusion.

The down counter is loaded with a value P of a pixel and counts down the value P till the output of the down counter becomes zero and the energization of the LED is stopped when the down counter has counted down the value P to zero. This allows precise control of a length of time during which the LED 7 emits light.

The embodiment employs the image data based on darkness and therefore the value of pixels of the image data is counted down by the down counter 61, thereby controlling the a length of time during which the LED 7 emits light. When employing image data based on intensity, the value of pixel of image data may be up-counted or a difference between a value and a maximum value of the image data may be down-counted in order to control a length of time during which the LED 7 emits light.

The gradation of an image may be achieved by method A where the intensity of light is constant and a length of time during which the light is emitted is changed, method B where a length of time during which the light is emitted is constant and the intensity of light is changed, and method C where the intensity of light and a length of time during which the light is emitted are changed.

If method B is to be used, a means is required which controls the bias current flowing through the LED. Thus, the method B makes the apparatus complex and increases the manufacturing cost. In contrast, the first embodiment employs the method A, and therefore provides a simple and low cost apparatus as compared to the method B.

If the method A is applied to a laser printer, the laser light scans each line in the traverse direction while illuminating each pixel for a corresponding length of time specified by the value of P. This way of exposure is such that the exposure of a pixel is begun after completion of the exposure of the preceding pixel, a total exposure time for the line being necessarily long. In contrast to this, the pixels are illuminated by corresponding LEDs 7 and the LEDs are independently energized. In other words, the energization of an LED for one pixel can be started before the energization of the LED for the preceding pixel completes. This feature provides high-speed exposure.

Since the value P of each pixel is transferred over the data bus 101 to the corresponding drive circuit 18, the complexity of wiring between the respective drive circuits 18 and the image memory 12 is reduced.

While the first embodiment has been described with reference to the LEDs 7 that are energized in a predetermined order from the first LED to Nth LED, the LEDs may be energized in a different order by controlling the drive circuits in a different order.

Second embodiment

<Construction>

Figure 5:
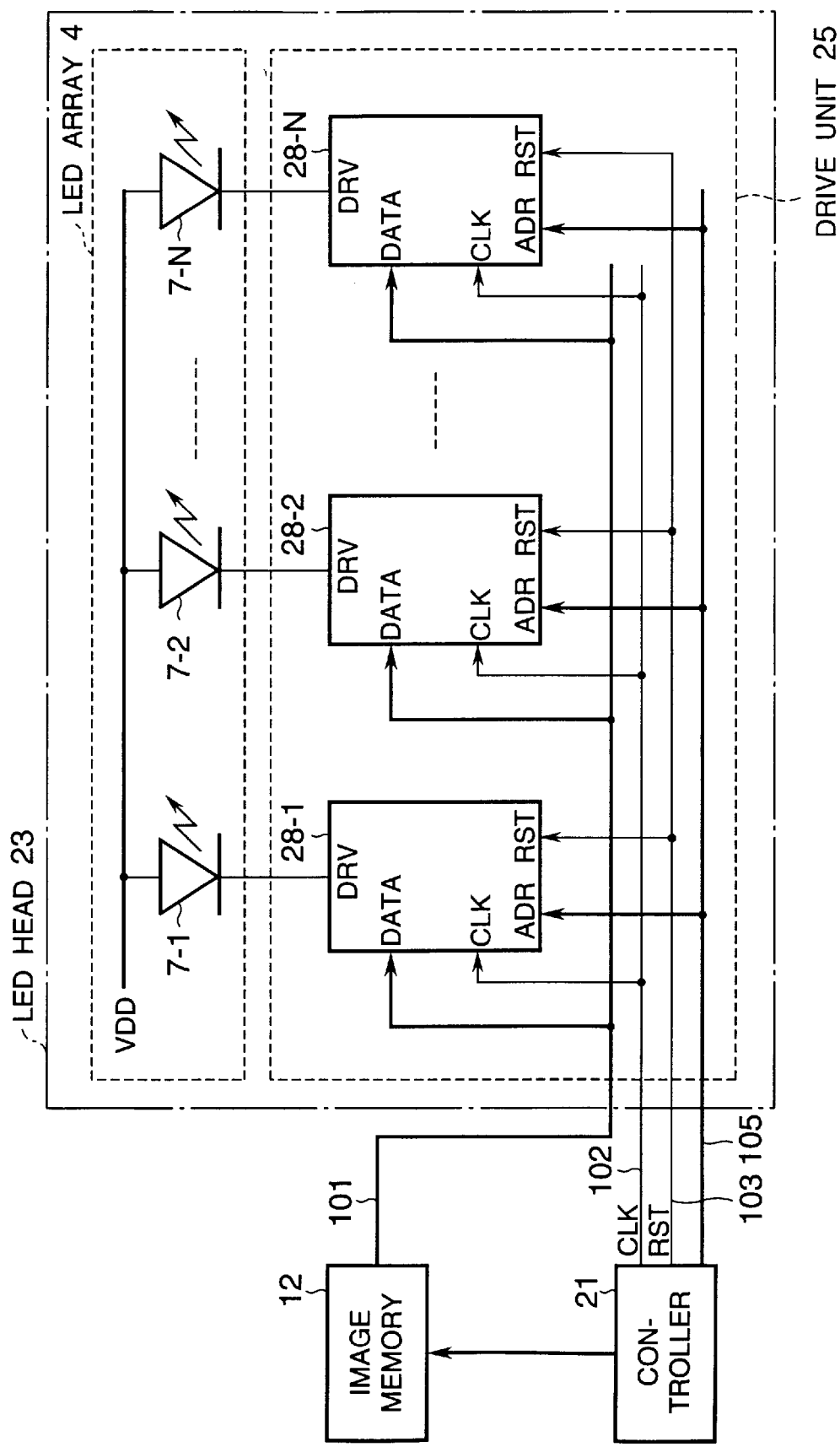
FIG. 5 shows a relevant portion of a second embodiment of an electrophotographic printer of the invention.

FIG. 5 shows a relevant portion of a second embodiment of an electrophotographic printer of the invention. The electrophotographic printer includes a controller 21, an image memory 12, and an LED head 23. The LED head 23 includes an LED array 4 having LEDs 7-1 to 7-N arranged in line, and a drive unit 25 that drives the LEDs 7-1 to 7-N. The drive unit 25 has drive circuits 28-1 to 28-N that are connected to corresponding LEDs 7. The drive circuits 28 hold addresses representing corresponding LEDs.

Each of the drive circuits 28-1 to 28-N has an output terminal DRV and input terminals DATA, ADR, and RST. The input terminals DATA are connected to the image memory 12 via the data bus 101 that includes a plurality of data signal lines. The input terminals CLK are connected to the controller 21 via the common control signal line 102. The input terminals RST are connected to the controller 21 via the control signal line 103. The input terminals ADR are connected to the controller 21 via address bus 105 that includes a plurality of signal lines. The output terminals DRV are connected to corresponding LEDs 7.

The controller 21 outputs addresses to the image memory 12 in order to read the values of pixels from the image memory 12, and addresses representing corresponding LEDs to the drive circuits 28-1 to 28-N over the address bus 105. The image memory 12 outputs the addressed value to the drive circuits over the data bus 101. The controller 21 outputs clock CLK to the drive circuits over the control signal line 102 and the RST over the control signal line 103 so as to control the drive circuits in the drive unit 25.

Figure 6:
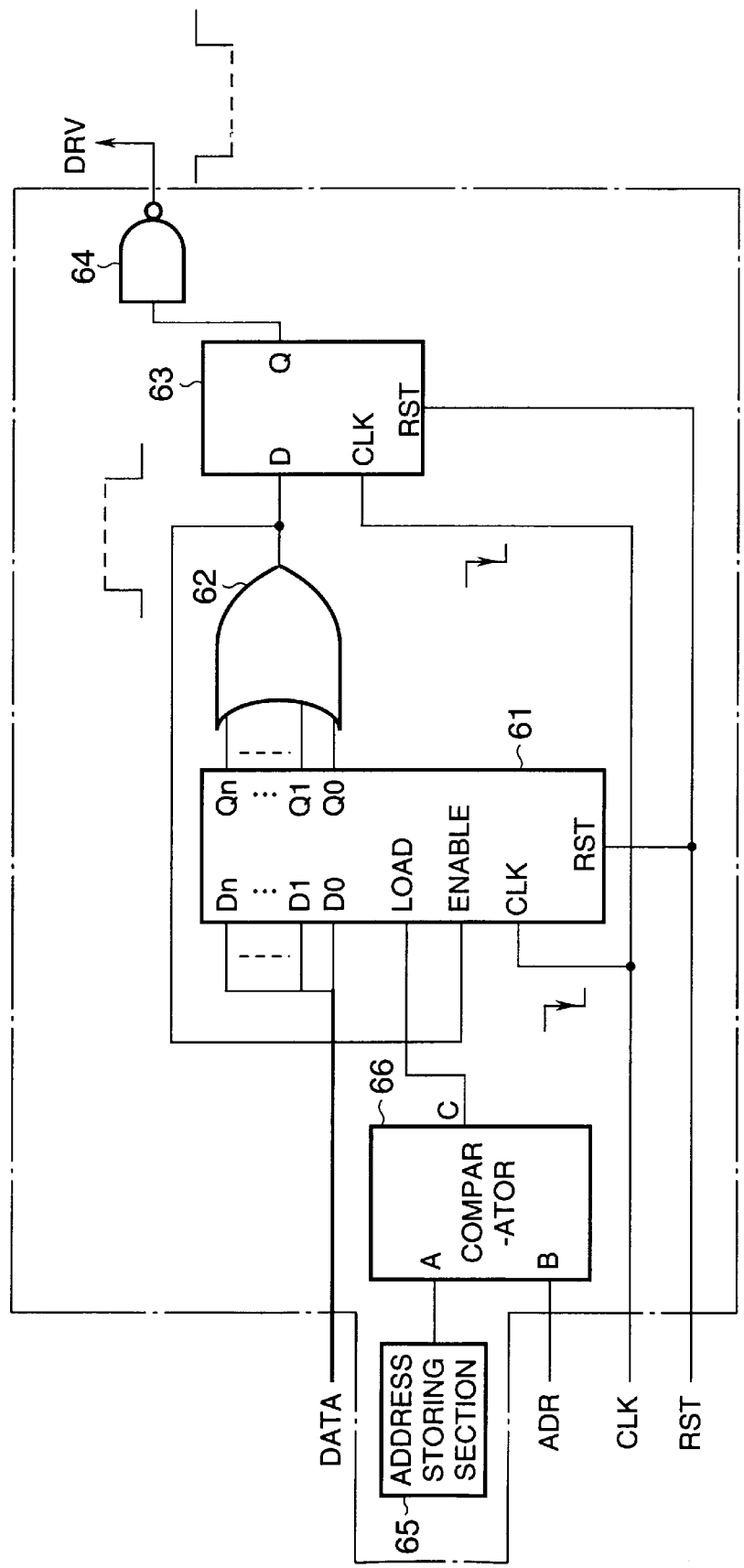
FIG. 6 is a block diagram illustrating a configuration of the drive circuit 28 of FIG. 5.

FIG. 6 is a block diagram illustrating a configuration of the drive circuit 28 of FIG. 5.

The drive circuit 28 differs from the drive circuit 18 of FIG. 2 in that there are an address storing section 65 and a comparator 66.

The address storing section 65 holds addresses of the LED 7-1 to 7-N. The comparator 66 has two input terminals A and B and an output terminal C. The input terminal A is connected to the address storing section 65. The input terminal B is connected to the input terminal ADR of the drive 28 to receive addresses from the controller 21. The output terminal C is connected to the input terminal LOAD of the down counter 61. The comparator 66 compares the address of the LED 7 received from the controller 21 with that stored in the address storing section 65, and outputs an active output when the two addresses coincide with each other. The down counter 61 is loaded with values of the pixels on the data bus 101 when the output of the comparator 66 becomes active.

On the falling edge of clock C1, the down counter 61 is loaded with the value P1 of a pixel through input terminals D0-Dn. Since at least one of the bits of the value P1 is a logic "1", one of the output bits Q0 to Qn of the down counter 61 is a logic "1". Thus, the output of the OR gate 62 becomes a logic "1" which sets the ENABLE of the down counter 61 active. The remaining operation is the same as that of the first embodiment and the description is omitted.

<Advantages>

The drive circuits 28 are loaded with the values of pixels on the data bus 101 only when the address stored in the drive circuits 28 coincide with the address on the address bus 105. This configuration eliminates the address selection lines 104 which are required in the first embodiment. As a result, the wiring for electrical connection between the controller 21 and the respective drive circuits 28 can be simplified, reducing circuit scale and manufacturing cost of the apparatus.

Third embodiment

<Construction>

Figure 7:
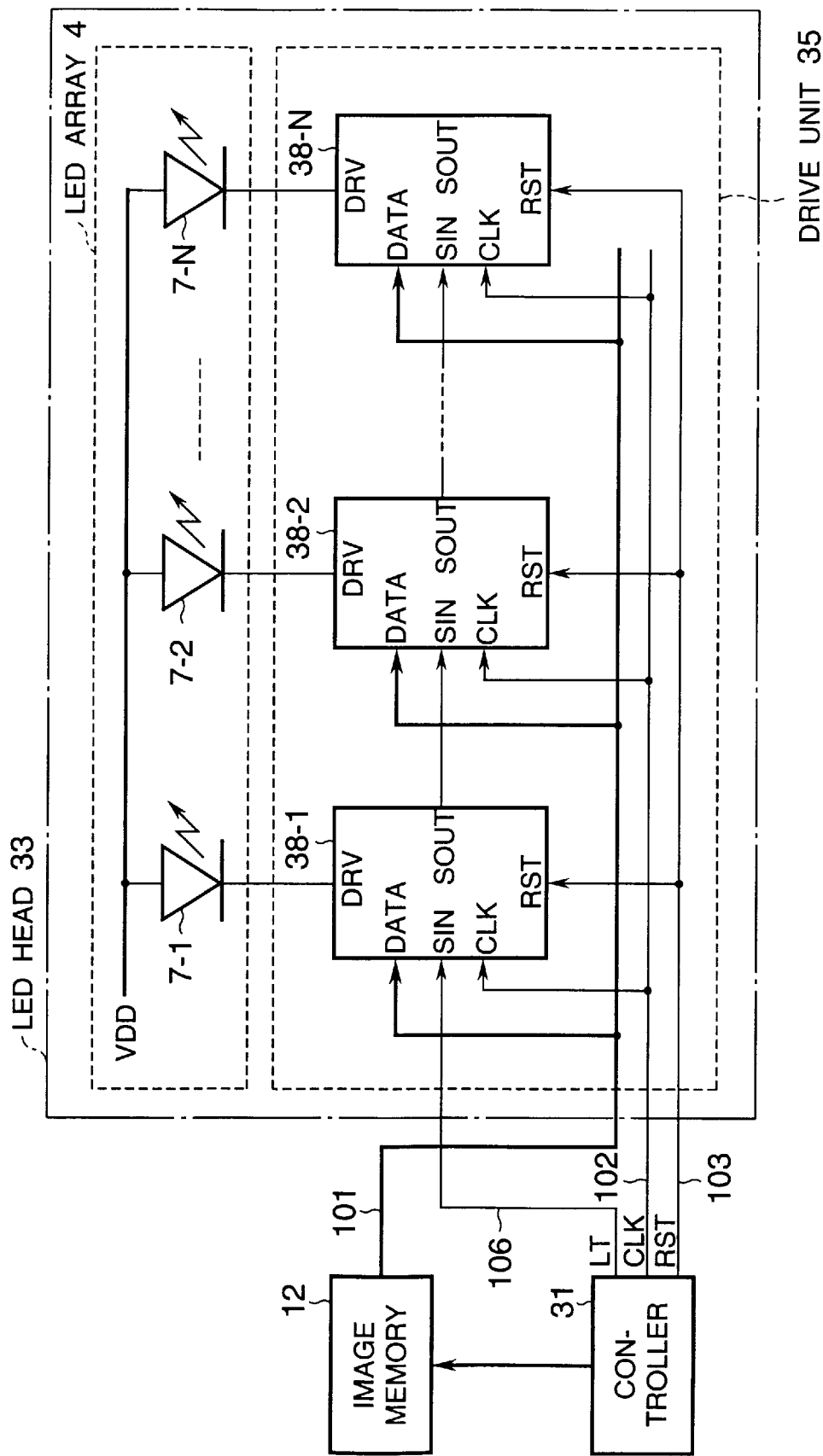
FIG. 7 shows a relevant portion of a third embodiment of an electrophotographic printer of the invention.

FIG. 7 shows a relevant portion of a third embodiment of an electrophotographic printer of the invention. The electrophotographic printer includes a controller 31, an image memory 12, and an LED head 33.

The LED head 23 includes an LED array 4 having LEDs 7-1 to 7-N arranged in line, and a drive unit 25 that drives the LED array 4. The drive unit 35 has drive circuits 38-1 to 38-N that drive corresponding LEDs 7 of the LED array 4.

Each of the drive circuits 38 has output terminals SOUT and DRV and input terminals DATA, CLK, SIN, and RST. The input terminals DATA are connected to the image memory 12 via the data bus 101 that includes a plurality of data signal lines. The input terminals CLK are connected to the controller 31 via the common control signal line 102. The input terminals RST are connected to the controller 31 via the common control signal line 103.

The drive circuits are serially connected in such a way that the output terminal SOUT of one drive circuit is connected to the input terminal SIN of the following drive. The input terminal SIN of the first drive circuit 38-1 is connected to the controller 31 via a line trigger signal line 106. The output terminals DRV are connected to the corresponding LEDs 7.

The controller 31 outputs addresses to the image memory 12 so that the image memory 12 outputs the values of pixels therein via the data bus 101 to the drive circuits 38. For example, when reading the value of the first pixel of a line, the controller 31 also outputs the line trigger signal LT to the first drive circuit 38-1 over the line trigger signal line 106. The controller 31 outputs clock CLK over the control signal line 102 while also outputting RST over the control signal line 103, thereby controlling the drive circuits 38-1 to 38-N of the drive unit 35.

Figure 8:
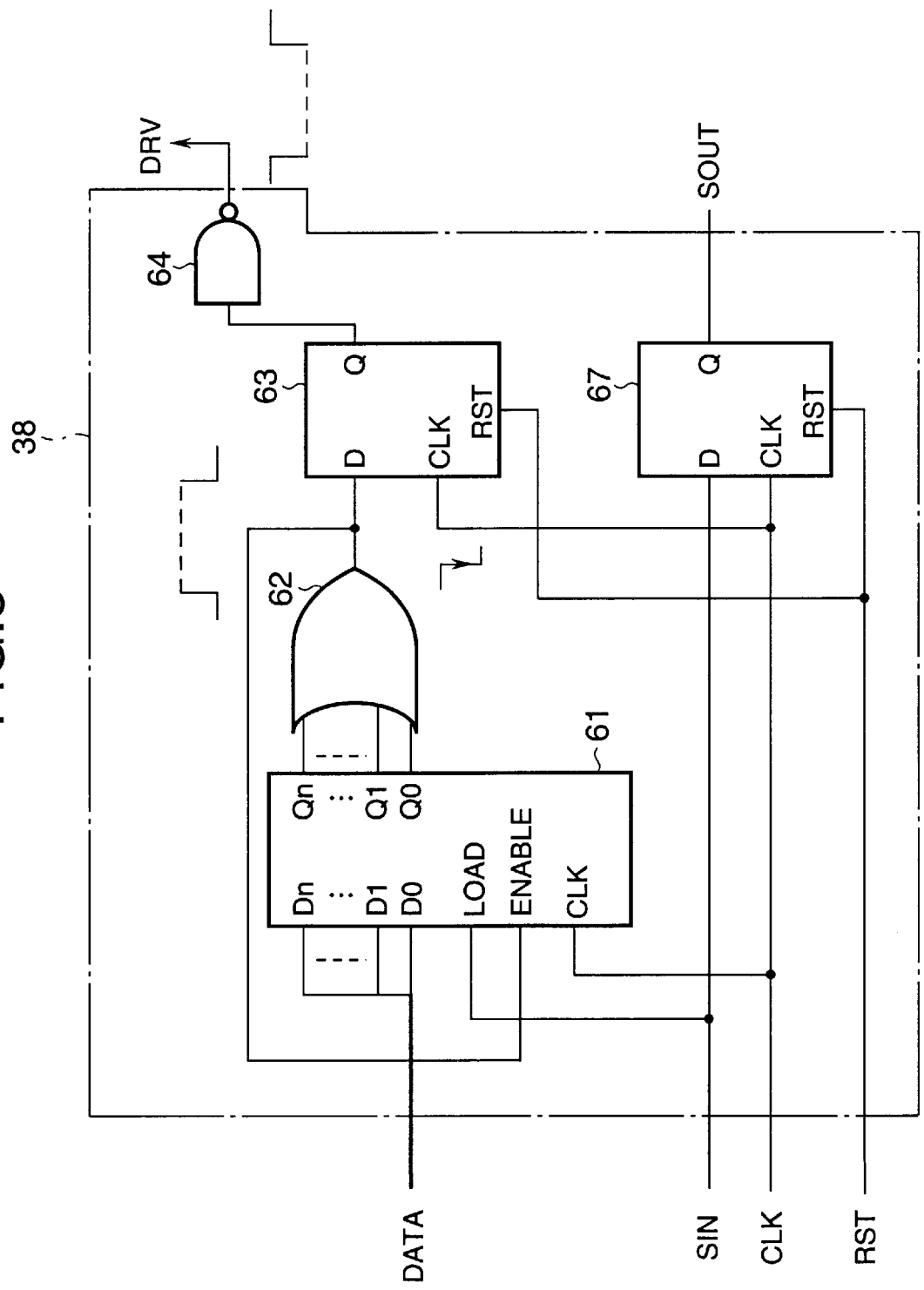
FIG. 8 is block diagram illustrating the configuration of he drive circuit 38 of FIG. 7.

FIG. 8 is a block diagram illustrating the configuration of the drive circuit 38 of FIG. 7.

Referring to FIG. 8, the drive circuit 38 differs from drive circuit 18 of FIG. 2 in that an additional flip-flop 67 is provided.

The flip-flop 67 has an output terminal Q and input terminals D, CLK, and RST. The input terminal CLK of the flip-flop 67 is connected to the input terminal CLK of the drive circuit 38. The input terminal RST of the flop-flop 67 is connected to the input terminal RST of the drive circuit 38 so that the flip-flop 67 receives the RST from the controller 31 over the control signal line 103. The input terminal D is connected to the input terminal SIN of the drive circuit 38 and the output terminal Q is connected to the output terminal SOUT of the drive circuit 38. The flip-flop 67 receives the output signal SOUT of the preceding drive circuit 38 and transfers it to the input terminal SIN of the following drive circuit 38. The input terminal LOAD of the down counter 61 is connected to the input terminal SIN of the drive circuit 38.

<Operation>

Figure 9:
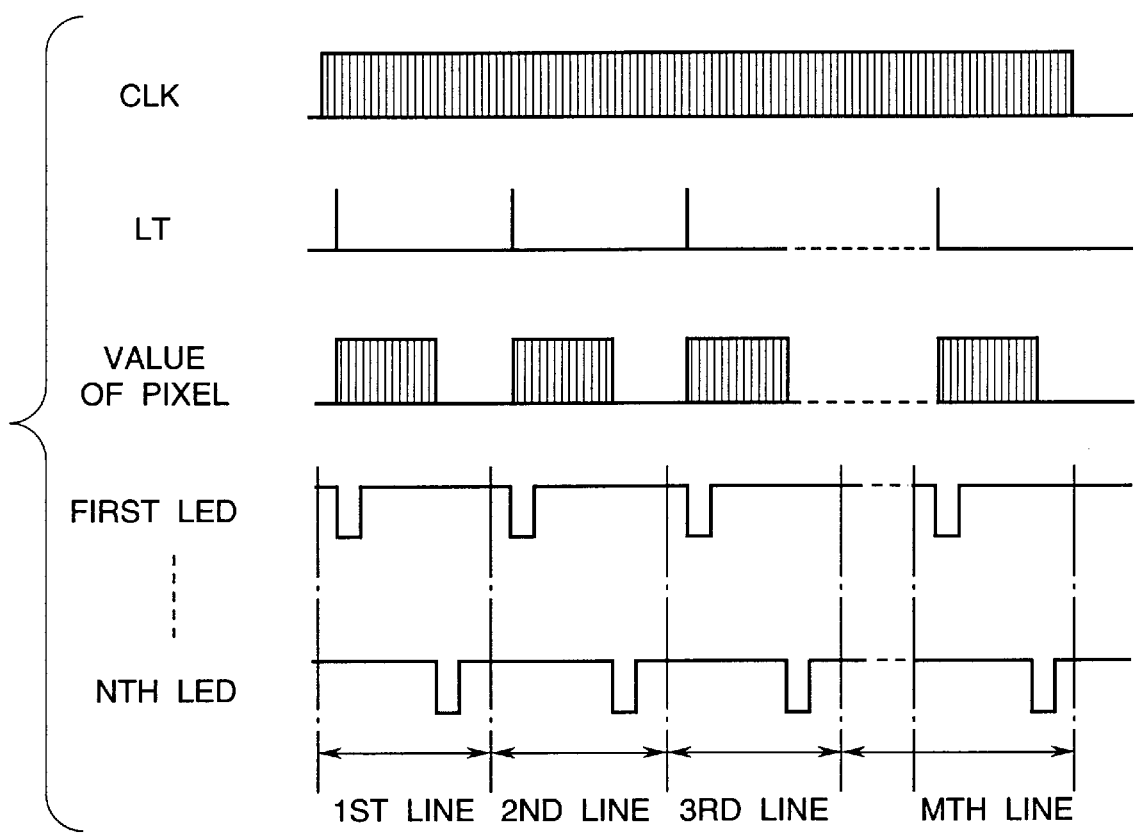
FIG. 9 is a timing chart illustrating the operation of an electrophotographic printer according to the third embodiment.

FIG. 9 is a timing chart illustrating the operation of an electrophotographic printer according to the third embodiment.

The electrophotographic printer of the third embodiment operates on a line-by-line basis just as in the first embodiment. The values of pixels of each line are read from the image memory 12 in the order in which the LEDs 7 are aligned and are loaded into the corresponding drive circuits 38 which in turn drive the corresponding LEDs 7. The controller 31 outputs addresses to the image memory 12 to read the values of pixels of each line while also outputting the LT signal to the drive circuit 38 over the line trigger signal line 106.

Figure 10:
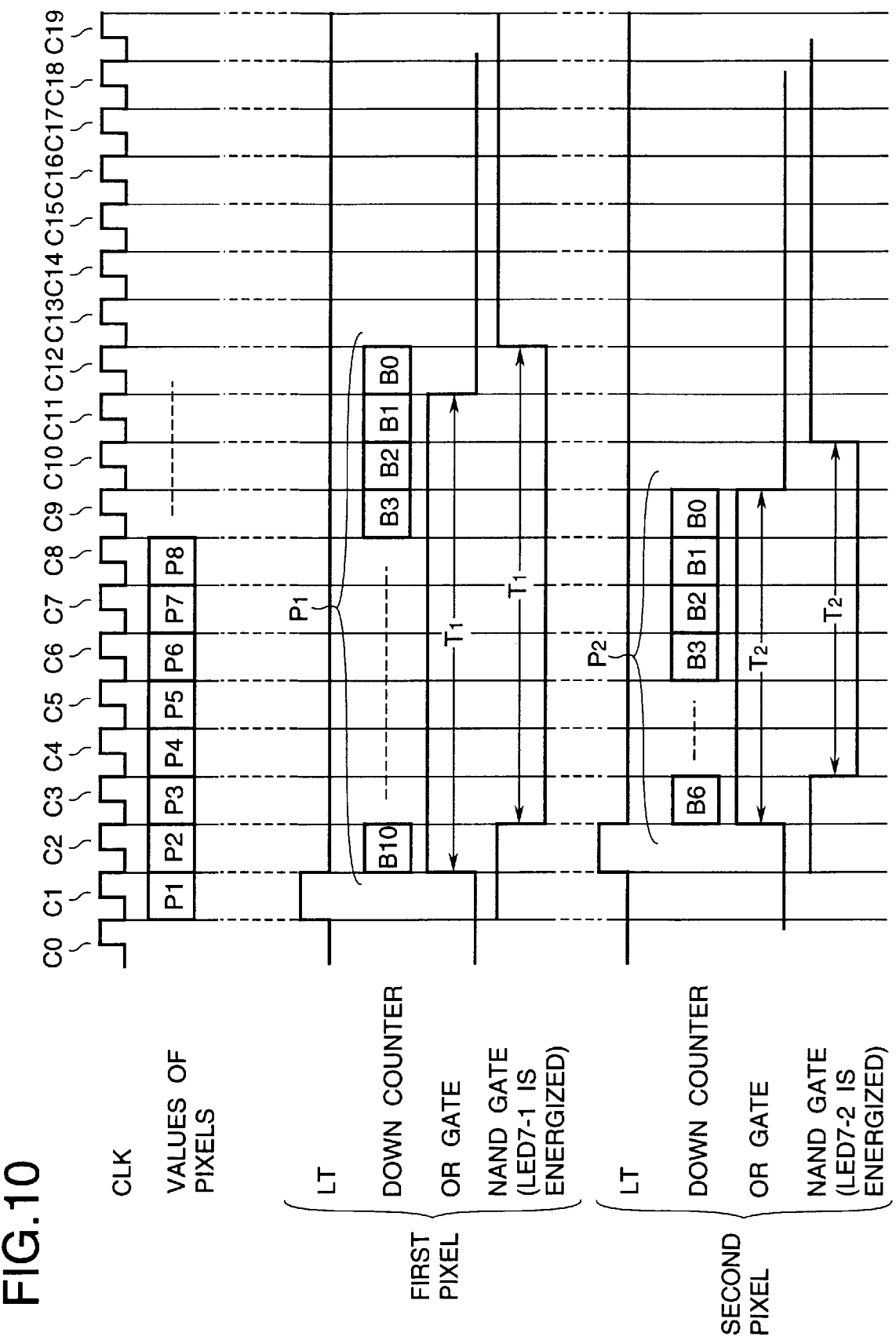
FIG. 10 is a timing chart illustrating the operation of an electrophotographic printer of the third embodiment.

FIG. 10 is a timing chart illustrating the operation of an electrophotographic printer of the third embodiment.

FIG. 10 illustrates the detailed operations of the drive circuits 38-1 and 38-2 when the values of pixels in the first and second lines are transferred.

First, the operation of the drive circuit 38-1 will be described.

The image memory 12 is addressed on the falling edge of clock C0 to output the value P1 of the first pixel of the first line to the data bus 101 while at the same time the controller 31 outputs the LT to the drive circuit 38-1 over the LT line 106. The LT is directed to the input terminal LOAD of the down counter 61 and the input terminal D of the flip-flop 67. As a result, the down counter 61 becomes active.

The down counter 61 is loaded with the value P1 through input terminals D0-Dn on the falling edge of clock C1. As a result, the output of the OR gate 62 becomes a logic "1" which sets the ENABLE of the down counter 61 active. The LT is latched into the flip-flop 67 on the falling edge of clock C1 so that the LT appears on the output SOUT of the flip-flop 67. The SOUT of the drive circuit 38-1 is input to the SIN of the second drive circuit 38-2.

The output of a logic "1" of the OR gate 62 is latched into the flip-flop 63 on the falling edge of the clock C2 so that the NAND gate 64 drives the LED 7-1 to emit light while at the same time the down counter 61 begins to count down the value P1 of the image data on the falling edge of clock C3. The value P1 is counted down on the falling edges of the clocks.

During a period from the falling edge of clock C2 to the falling edge of clock C11, the value of the data P1 is decremented by one on the falling edge each clock, and the LED 7-1 remains energized for the period. The value of P1 is, for example, "1010" (=10 decimal). The output of the OR gate 62 remains a logic "1" during the period and the output of the flip-flop 63 remains a logic "1". The NAND gate 64 continues to drive the LED 7-1 so that the LED 7-1 remains energized.

Next, the operation of the second drive circuit 38-2 will be described.

The image memory 12 is addressed on the falling edge of clock C2 to output the value P2 of the second pixel to the data bus 101 while at the same time the output (i.e., LT=SOUT) of the first drive circuit 38-1 is input into the input terminal SIN of the second drive circuit 38-2 and into the input terminal D of the flip-flop 67 of the second drive circuit 38-2. As a result, the input terminal LOAD of the down counter 61 of the second drive circuit 38-2 becomes active.

The down counter 61 is loaded with the value P2 through terminals D0-Dn on the falling edge of clock C2. The value of P2 is, for example, "0111" (7 decimal). As a result, the output of the OR gate 62 becomes a logic "1" which sets the ENABLE of the down counter 61 active.

The LT is latched into the flip-flop 67 so that the output of the flip-flop 67 is directed to the third drive circuit 38-3 through the output terminal SOUT of the second drive circuit 38-2.

The output of the OR gate 62 is latched into the flip-flop 63 on the falling edge of the clock C3 so that the output of the NAND gate 64 goes low to drive the LED 7-2. At the same time, the down counter 61 begins to count down the value P2 of the second pixel on the clock C3, and thereafter the value P2 is counted down by one on the falling edge of each clock so that the LED 7-2 remains energized until the falling edges of the clock C10.

In this manner, the values of the respective pixels are output in sequence to the data bus 101 on the falling edges of the clocks CLK, and the drive circuits receive the LT from their preceding drive circuits on the falling edges of the clocks CLK. Thus, each of LEDs 7-1 to 7-N begins to emit light upon the falling edge of the clock CLK and continues to emit light in accordance with the value of the pixel, i.e., for a period equal to the number of clocks.

<Advantages>

The third embodiment simplifies the complexity of the wiring between the controller 31 and drive circuits 38 and interconnection between the drive circuits in the drive unit 35, allowing miniaturizing of the circuit. The controller 31 is required only to output the LT on a line-by-line basis, so that the controller 31 controls the drive circuits in a simple way.

Fourth embodiment

<Construction>

Figure 11:
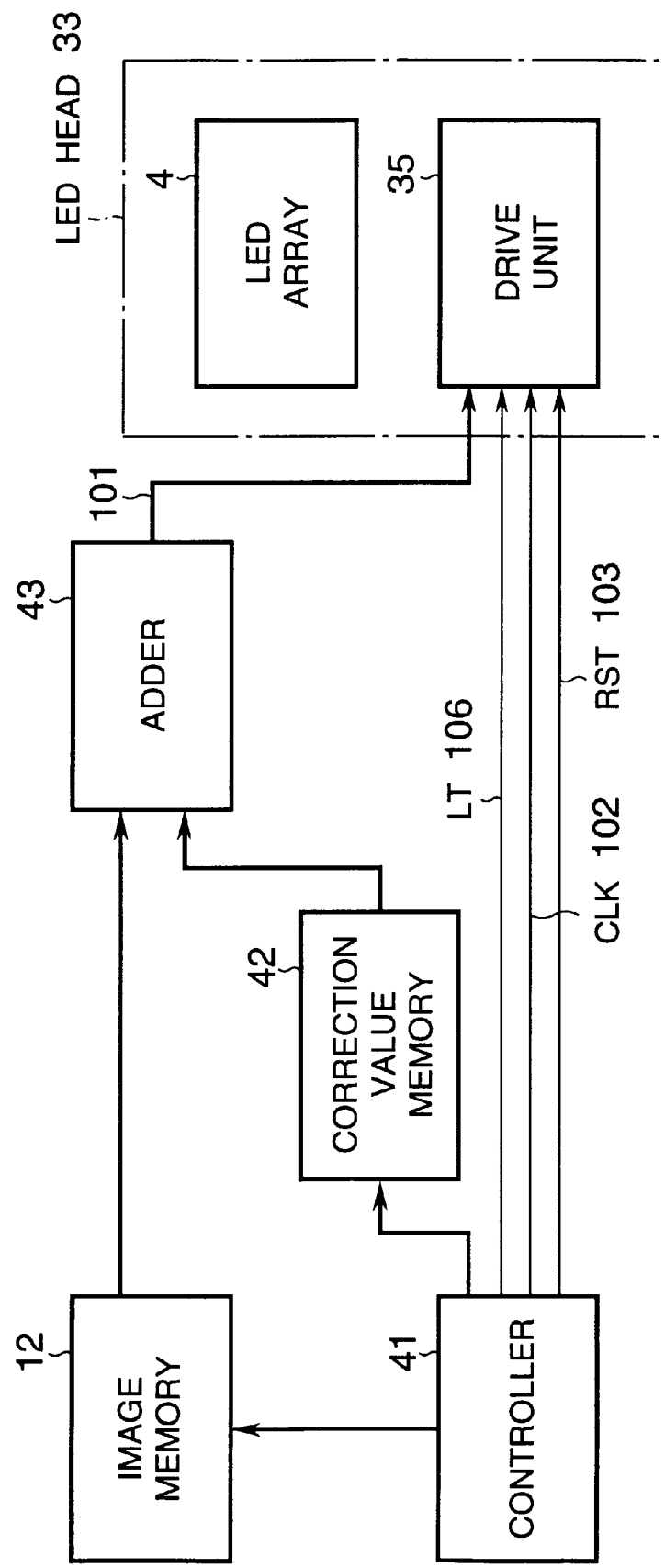
FIG. 11 shows a relevant portion of a fourth embodiment of an electrophotographic printer of the invention.

FIG. 11 shows a relevant portion of a fourth embodiment of an electrophotographic printer of the invention. The electrophotographic printer differs from that of FIG. 7 in that a controller 41 is used in place of the controller 31 and there are provided a correction value memory 42 and an adder 43. The LED head 33 of the fourth embodiment is of the same construction as that of the third embodiment and the description thereof is omitted.

The amount of light emitted by individual LEDs varies from LED to LED due to manufacturing variations. Too large a variation causes a noticeable variation of print density which leads to poor image quality.

In the fourth embodiment, the values of pixels are corrected by adding correction values which have been determined previously. The correction values are determined by actually measuring the amount of light emitted by individual LEDs after the LED head 33 has been assembled. The correction value is used to change a length of time during which an LED is energized, thereby maintaining substantially the same amount of light emitted from the LED during a length of time specified by the corrected value of pixel. For example, if printed dots are to be of the same density, LEDs having lower intensity of light is energized longer than LEDs having higher intensity of light. The correction values may be positive or negative depending on the light-emitting characteristics of the individual LEDs.

The controller 41 outputs addresses to the image memory 12 to read the values of pixels therefrom, the address representing a specific LED to be energized. The image memory 12 outputs a value of the pixel specified by the address to the adder 43.

The correction value memory 42 stores the correction values for corresponding LEDs and outputs the correction values corresponding to the LED specified by the addresses outputted from the controller 41.

The adder 43 adds the correction value to the corresponding value of a pixel outputted from the image memory 12, and outputs the sum to the drive unit 35.

The drive circuits 38 in the drive unit 35 receive the output of the adder 43 and drive the corresponding LEDs 7-1 to 7-N.

<Operation>

Figure 12:
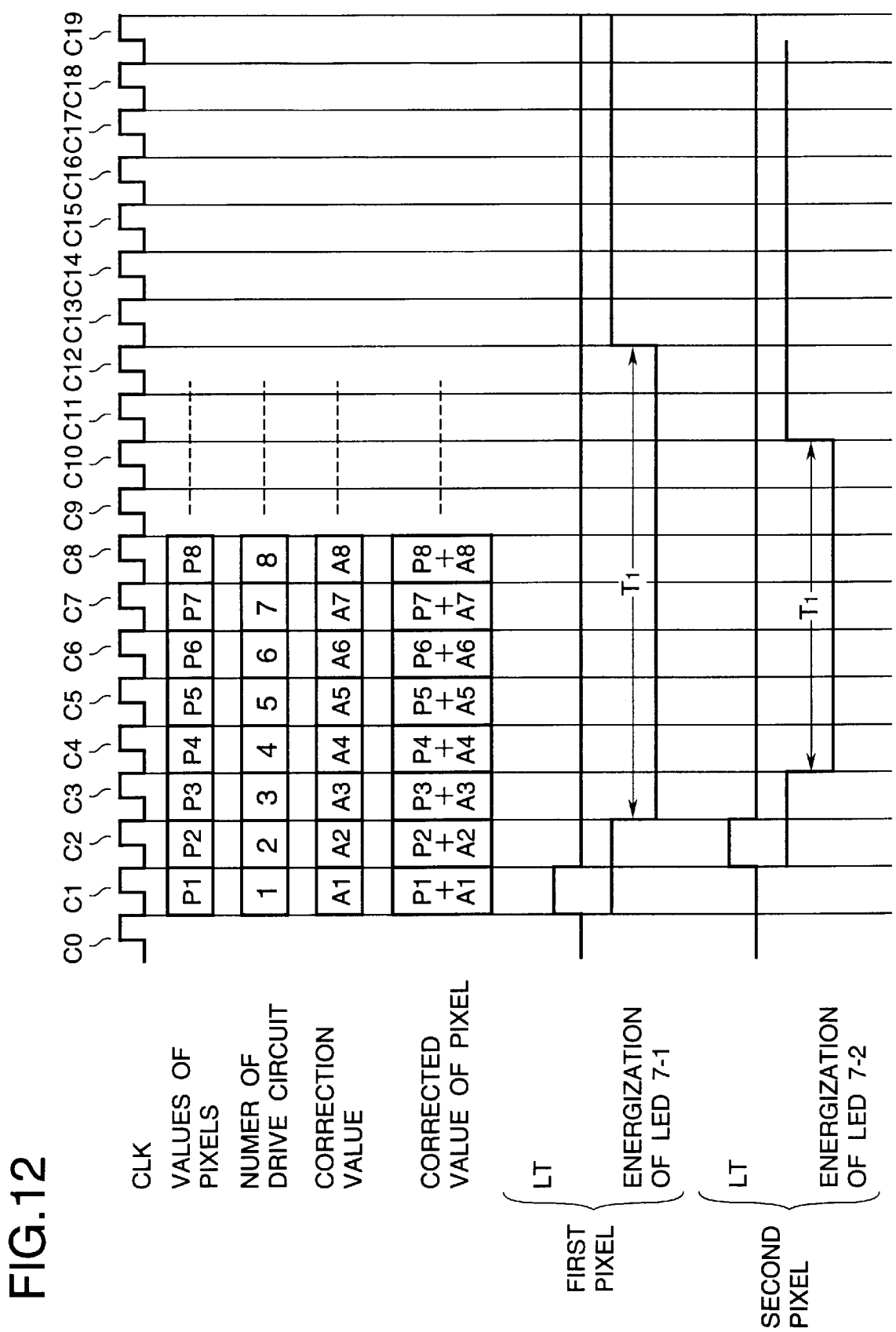
FIG. 12 is a timing chart illustrating the operation of the electrophotographic printer according to the fourth embodiment.
Figure 13:
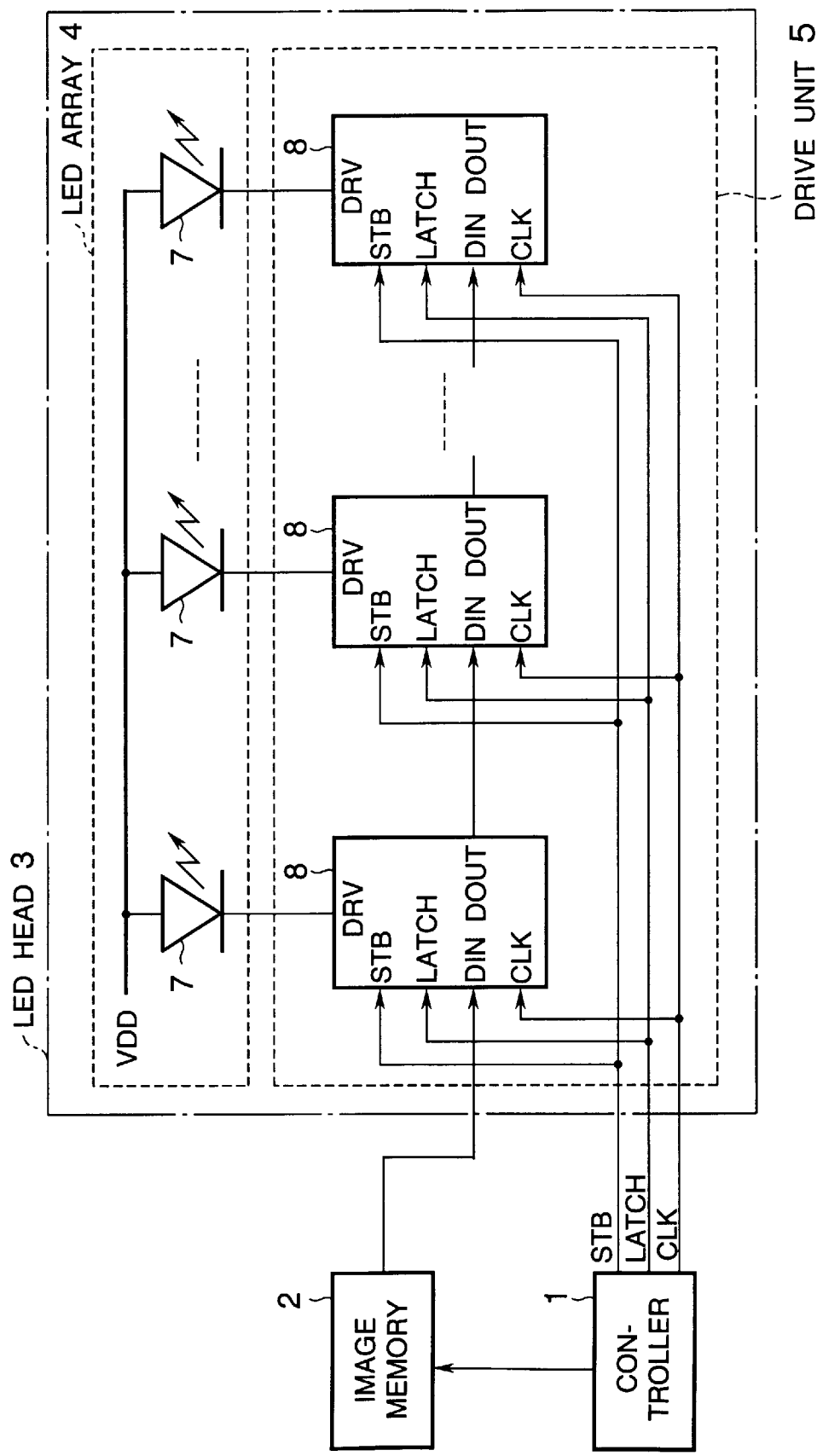
FIG. 13 illustrates a part of a conventional printer.

FIG. 12 is a timing chart illustrating the operation of the electrophotographic printer according to the fourth embodiment. The electrophotographic printer of the fourth embodiment operates on a line-by-line basis just as in the other embodiments.

On the falling edge of clock C0, the controller 41 outputs an address to the image memory 12 to read the value P1 of the first pixel of a line and a number "1" indicative of the first LED 7-1 to the correction value memory 42. The correction value memory 42 outputs a correction value A1 for the number "1" to the adder 43. The adder 43 adds the value P1 of the first pixel to the correction value A1 and outputs the sum (P1+A1) to the first drive circuit 38-1. The drive circuit 38-1 starts driving the LED 7-1 on the clock C2 so that the LED 7-1 begins to emit light and continues to emit light as long a time as the number of clocks that count down the sum P1+A1.

On the falling edge of clock C1, the controller 41 outputs an address to the image memory 12 to read the value P2 of the second pixel of the line and a number "2" indicative of the second LED 7-2 to the correction value memory 42. The correction value memory 42 outputs a correction value A2 for the number "2" to the adder 43. The adder 43 adds the value P2 of the second pixel to the correction value A2 and outputs the sum (P2+A2) to the second drive circuit 38-2. The drive circuit 38-2 drives the LED 7-2 on clock C2 so that the LED 7-2 begins to emit light and continues to emit light as long a time as the number of clocks that count down the sum (P2+A2). Likewise, the remaining LEDs are driven.

<Advantages>

The variations of intensity of light emitted from the LEDs can be corrected by increasing or decreasing the time period during which individual LEDs are energized. This implies that variations of light-emitting characteristic of individual LEDs can be accommodated to some extent, increasing yield of the LED head. Thus, the fourth embodiment reduces the manufacturing cost of the LED head.

The fourth embodiment may be modified such that each drive circuit 38 incorporates a corresponding memory that stores a corresponding correction values and an adder that adds the correction value to a corresponding value of pixel. Multiplying respective values of pixels may also make correction of the values of pixels. Further, the combination of the addition of correction values and multiplication of coefficients may also make correction of the values of pixels. While the aforementioned embodiments have been described with respect to an LED head for an electrophotographic printer, the present invention may also be applicable to other types of print head having a plurality of light-emitting elements, such as LCS (liquid crystal shutter).

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An electrophotographic printer having a print head that illuminates a photoconductor to form an electrostatic latent image on the photoconductor, comprising:

a plurality of light-emitting elements each of which corresponds to one of pixels of the image and emits light when driven;

a plurality of drive circuits connected to a common data bus and a common address bus, each of said plurality of drive circuits driving a corresponding one of said plurality of light-emitting elements in accordance with a corresponding one of values of the pixels, having a counter that receives and counts the corresponding one of the plurality of values of the pixels, wherein each of said plurality of drive circuits starts driving the corresponding one of said plurality of light-emitting elements after the counter is loaded with a corresponding one of the plurality of values of the pixels, and stops driving when the counter has fully counted the corresponding one of the plurality of values of the pixels; and a controller, outputting the plurality of values of the pixels onto the common data bus to be received by the drive circuits in a predetermined order, said controller thereby controlling said plurality of drive circuits to start driving corresponding ones of said plurality of light-emitting elements in the predetermined order such that a preceding one of said plurality of drive circuits starts driving a corresponding one of said plurality of light-emitting elements earlier than a following one of said plurality of drive circuits.

2. The electrophotographic printer according to claim 1, wherein each of the values of the pixels defines a length of time during which a corresponding one of said plurality of light-emitting elements is energized to emit light.

3. The electrophotographic printer according to claim 2 further including:

a memory that stores correction values for a corresponding one of said plurality of light-emitting elements; and a correction section that changes the length of time using the correction values.

4. The electrophotographic printer according to claim 3, wherein the correction section changes the length of time by adding a corresponding one of the values of the pixels to a corresponding one of the correction values stored in the memory.

5. The electrophotographic printer according to claim 4, wherein each of the correction values is used to correct an amount of light emitted from a corresponding one of said plurality of light-emitting elements.

6. The electrophotographic printer according to claim 1, each of said plurality of drive circuits starts driving a light-emitting element upon receiving a timing signal supplied thereto, wherein said plurality of drive circuits are serially connected such that the timing signal is sequentially transferred through said plurality of drive circuits from a preceding drive circuit to a following drive circuit upon a clock; and wherein said controller outputs the timing signal to a drive circuit that drives a first light-emitting element to initiate energization of the first light-emitting element.

7. The electrophotographic printer according to claim 1, wherein the counter is loaded with the corresponding one of the plurality of values of the pixels every time a line of the image is formed.

8. An electrophotographic printer having a print head that illuminates a photoconductor to form an electrostatic latent image on the photoconductor, the printer comprising:

a plurality of light-emitting elements each of which corresponds to one of pixels of the image and emits light when driven;

a plurality of drive circuits connected to a common data bus and a common address bus, each of said plurality of drive circuits driving a corresponding one of said plurality of light-emitting elements in accordance with a corresponding one of values of the pixels, having a counter that receives and counts the corresponding one of the plurality of values of the pixels, being assigned a corresponding one of a plurality of first addresses, and having an address memory that stores the corresponding one of the plurality of first addresses; and a controller, controlling said plurality of drive circuits to start driving corresponding ones of said plurality of light-emitting elements in a predetermined order, wherein said controller outputs the plurality of values of the pixels onto the common data bus in a predetermined order and a plurality of second addresses onto the common address bus in the predetermined order; and each of said drive circuits receives the corresponding one of the plurality of values of the pixels only when the corresponding one of the plurality of first addresses stored in the address memory coincides with one of the plurality of second addresses outputted from said controller.

9. The electrophotographic printer according to claim 8, wherein each of the plurality of values of the pixels defines a length of time during which the corresponding one of said plurality of light-emitting elements is energized to emit light.

10. The electrophotographic printer according to claim 8, wherein each of said plurality of drive circuits includes a counter into which a corresponding one of the plurality of values of the pixels is loaded.

11. The electrophotographic printer according to claim 10, wherein each of said plurality of drive circuits starts driving the corresponding one of said plurality of light-emitting elements upon a first count signal being supplied to the counter.

12. The electrophotographic printer according to claim 11, wherein each of said plurality of drive circuits stops driving the corresponding one of said plurality of light-emitting elements when the counter completes counting the corresponding one of the plurality of values of the pixels.

13. The electrophotographic printer according to claim 10, wherein the counter is loaded with the corresponding one of the plurality of values of the pixels of time every time a line of the image is formed.

* * * * *